United States Patent [19]
Lillibridge et al.

[11] Patent Number: 5,943,856
[45] Date of Patent: Aug. 31, 1999

[54] TURBOFAN ENGINE WITH REDUCED NOISE

[75] Inventors: Robert W. Lillibridge, Woodland Hills; Kenneth R. McGuire, Encino; Edward J. Phillips, San Diego; Eugene James Matthews, Encino, all of Calif.

[73] Assignee: Burbank Aeronautical Corporation II, Burbank, Calif.

[21] Appl. No.: 08/905,148

[22] Filed: Aug. 1, 1997

Related U.S. Application Data

[62] Division of application No. 08/521,139, Aug. 29, 1995, Pat. No. 5,706,651.

[51] Int. Cl.$^6$ ........................................................ F02K 3/04
[52] U.S. Cl. ............................................. 60/262; 181/220
[58] Field of Search ................................. 60/226.1, 262; 181/213, 220; 239/127.3, 265.17; 415/119

[56] References Cited

U.S. PATENT DOCUMENTS

| | | |
|---|---|---|
| 2,588,532 | 3/1952 | Johnson . |
| 3,063,661 | 11/1962 | Smith . |
| 3,070,131 | 12/1962 | Wheatley . |
| 3,273,345 | 9/1966 | Spears . |
| 3,696,617 | 10/1972 | Ellis . |
| 4,117,671 | 10/1978 | Neal et al. . |
| 4,135,363 | 1/1979 | Packman . |
| 4,137,992 | 2/1979 | Herman . |
| 4,292,803 | 10/1981 | Prior . |
| 4,401,269 | 8/1983 | Eiler . |
| 4,543,784 | 10/1985 | Kirker . |
| 4,817,756 | 4/1989 | Carr et al. . |
| 4,836,469 | 6/1989 | Wagenfeld . |
| 4,909,346 | 3/1990 | Torkelson ................................ 181/213 |
| 5,042,245 | 8/1991 | Zickwolf, Jr. . |
| 5,127,602 | 7/1992 | Batey et al. . |
| 5,169,288 | 12/1992 | Gliebe et al. . |
| 5,372,006 | 12/1994 | Lair . |
| 5,440,875 | 8/1995 | Torkelson et al. ..................... 60/226.1 |
| 5,722,233 | 3/1998 | Nikkanen et al. ........................ 60/262 |

FOREIGN PATENT DOCUMENTS 2 247 712   3/1992   United Kingdom .

OTHER PUBLICATIONS

Program on Ground Test of Modified, Quiet, Clean, J3D and JT8D Turbofan Engines in their Respective Nacelles; Unclassified Report No. NAS CR–134553; Boeing Commercial Airplane Company (WA) & National Aeronautics and Space Administration (D.C.), Sep. 1973, pp. entire document.

Pratt & Whitney Aircraft Group, JTD8–200 Installation Handbook, Aug. 1988–Jul. 1978, pp. entire document.

Boeing Commercial Jet Overhaul Manual on the Thrust Reverser Adapter Assembly, Nov. 10, 1977, pp. entire document.

(List continued on next page.)

*Primary Examiner*—Louis J. Casaregola
*Attorney, Agent, or Firm*—Oppenheimer, Wolff & Donnelly LLP

[57] ABSTRACT

A noise reduction kit for modifying a two (2) spool axial flow turbofan engine with multi-stage compressors and fan driven by multi-stage reaction turbines, and a thrust of at least about 18,000 lbs. at sea level. There is a fan at the upstream end of the core engine for generating axial fan air flow through bypass ducts terminating at a common nozzle, the common nozzle having a mixing plane area for each of the fan air flow and for the exhaust gas in a range between 700 and 800 square inches. A target thrust reverser includes opposing doors rotatable into position to block and divert the flow of exhaust gas for generating reverse thrust. Mixing means for radially diverting fan air and permitting radially outward expansion of exhaust gas is provided coaxially downstream to the core engine. An acoustically dampened light bulb-shaped nose cone is provided for coaxial attachment to an upstream end of the core engine. The axial flow front fan is axially separated from the inlet guide vane is extended relatively forwardly. A bleed air valve, selectively operational to bleed air from the core engine when the valve is open, is ducted for directing bleed air to the vicinity of the common nozzle.

19 Claims, 7 Drawing Sheets

OTHER PUBLICATIONS

United Technologies Pratt & Whitney, Model Specification, Model JT8D–209 Turbofan Engine Model Specification Guaranteed Calibration Stand Performance, Jan. 10, 1977, pp. 1 & 2.
Boeing Commercial Jet Overhaul Manual on Cascade Installation, 1975–1987, pp. entire document.
Blumenthal, V. L. et al., Aircraft Community Noise Research and Development: A Historical Overview, J. Acoustical Society of America, vol. 58, No. 1, Jul. 1975, pp. 124–143.
Brindley, John F., Pratt & Whitney's JT8D–209 Program, Sep. 1978, pp. entire document.
Boeing Commercial Jet Overhaul Manual Thrust Reverser Tailpipe Assembly, Nov. 1975 & Nov. 1984, pp. 1108 & 1109.
Arctander, C. L., et al., Development of Noise–reduction Concepts for 727 and 737 Airplanes, *J. Acoustical Society of America*, vol. 58, No. 1, Jul. 1975, pp. 155–172.
Pratt & Whitney Aircraft JT8D Maintenance Manual, Nov. 1, 1981, p. 613.
Boeing Commercial Jet Overhaul Manual on the Thrust Reverser Installation, Nov. 15, 1968, 1pp.
Boeing Commercial Jet Overhaul Manual on a Forward Seal Assembly, Nov. 10, 1974, p. 503.
Boeing Commercial Jet Overhaul Manual on the Cascade Type Thrust Reverser Installation, May 10, 1982, 1pp.
Boeing Commercial Jet Overhaul Manual on the Thrust Reverser Installation, Figure 1101, May 10, 1975, p. 1102.
Pratt & Whitney JT3D Thrust Reverser Illustrated Parts Catalog, 1967–1976, pp. entire document.
Boeing Commercial Jet Overhaul Manual on the Thrust Reverser Clamshell Door Assembly, May 15, 1969, pp. 12–14.
Pratt & Whitney Aircraft United Technologies JT3D–7 "Turbofan engine model specification guaranteed calibration stand performance," May 1, 1964, p. 1.
United Technologies Pratt & Whitney Service Bulletin No. 5846 "Engine—fan and turbine exhaust duct assembly (mixer) and fan exhaust outer duct assembly (spacer case) addition of, and first stage fan blade chamber cut for noise attenuation," Revision No. 1, Apr. 12, 1990, pp. 1–3, 16.
United Technologies Pratt & Whitney Service Bulletin No. 5948 "Engine—case assembly, fan inlet—Extension of to reduce noise, (for DC–9 Aircraft)," Revision No. 2, Nov. 30, 1992, pp. 1–2, 31, 45, 48.
United Technologies Pratt & Whitney Service Bulletin No. 6048 "Engine—screws and rivet pins—optional replacement of with bolts and washers for fan duct fairing attachment," Oct. 7, 1991, pp. 1–9.
Pratt & Whitney Aircraft JT3D Commercial Turbofan Installation Handbook, Section 1, May 6, 1963, pp. 1.0–1.6, drawing entitled "Outline installation drawing–JT3D commercial engine for Boeing," Sep. 25. 1968.
Pratt & Whitney Aircraft JT3D Maintenance Manual, "Air—description and operation compressor bleed system," Jul. 15, 1971, p. 5, Aug. 1, 1962, pp. 6–7.
Pratt & Whitney Aircraft JT3D–7 Maintenance Manual, "Engine—description and operation," Nov. 1, 1967, pp. 1–5, 7–21, 48, May 15, 1968, p. 6.
Pratt & Whitney Aircraft JT8D Engine Manual (PN 481672—Restructured) "Engine General—Description–01," Sep. 1, 1980, p. 1, Oct. 1, 1983, pp. 3,6, Oct. 1, 1991, pp. 7–8.

Pratt & Whitney Aircraft JT8D Engine Manual (PN 481672—Restructured) "How to Use," Aug. 1, 1993, p. 28, drawing entitled "Noise reduction installation, JT8D," complete print No. SL89AAO68; drawing entitled "Fan region geometry, detailed comparison" for P&W JT80 Engine used on Fedx 727 and DC9–ABS, 1990.
Pratt & Whitney Aircraft Group United Technologies, JT8D–200 Series Commercial Turbofan Engine Installation Handbook, Jul. 1978, Revised: Aug. 16, 1984, p. 1.5, drawing entitled "Fan extended inlet geometry similarities."
Pratt & Whitney (FR–22375) Section 2.0 Engine Description, FAA Spec. Sheet, Jan. 24, 1979, pp. 2–1 to 2–4.
Boeing 707 Intercontinental Maintenance Manual, "Effectivity Turbofan, Compressor Surge Bleed Valve Schedule, Figure 2" Aug. 15, 1975, p. 4.
Douglas Aircraft Co. DC–8 Sixty Series Maintenance Manual, "Cowling—Description and Operation," Aug. 1, 1968, 71–10–0 CODE 2 pp. 1–2; Nov. 1, 1967, 71–10–3, CODE 2, p. 202; Aug. 1, 1967, 71–10–4, Code 1, p. 203.
Douglas Aircraft Co. DC–8 Sixty Series Maintenance Manual, "Collector—Description and Operation," Aug. 1, 1968, 78–10–0, CODE 2, p. 1; Oct. 1, 1967, 78–10–0, CODE 2, p. 2; Jun. 15, 1969, 78–10–3, CODE 2, pp. 204–206.
Douglas Aircraft Co., Inc. DC–9 Maintenance Manual, drawing entitled "Thrust Reverser Doors—Installation (Figure 201)," Mar. 1, 1977, 78–30–2, CODE 5, p. 202.
McDonnell Douglas Corporation DC–9 Illustrated Parts Catalog, drawing entitled "Series 87 Thrust Reverser Assembly, Figure 25A, (Sheet 1)," Fig. 25A, p. 0, Oct. 1, 1992.
McDonnell Douglas Corporation Super 80 Maintenance Handbook, drawing entitled "Thrust Reverser Door Latches," Nov. 1983, pp. 78–209.
Douglas Aircraft Company McDonnell Douglas Corporation DC–9–80 "Nacelle Stress Analysis vol. III," Jul. 1978, Functional Description, Nozzle Assy p. 4.1.1; Thrust Reverser, General Information p. 5.0.4; Thrust Reverser, Structural Description p. 5.1.1.
Department of Transportation Federal Aviation Administration "Type Certificate Data Sheet No. 1E8," 1E8–17 Pratt & Whitney Aircraft, Turbo Wasp, Jul. 20, 1979, pp. 1–7; "Type Certificate Date Sheet," E3EA–6 pp. 1–3; drawing entitled "TF33 Engine Specifications;" "TF33 Overview, Family history—in service beyond 2025;" "TF33/JT3D Engine Family."
The Boeing Company Report No. NASA CR–1714 entitled "Study and Development of Turbofan Nacelle Modifications to Minimize Fan–Compressor Noise Radiation. Vol. IV—Flightworthy Nacelle Development," Jan. 1971, pp. B00384, B00397–B00447, and B00511–B00532.
Photocopies of 11 photographs of the Boeing Company 707–320C modified engine in 1971.
Douglas Aircraft Company, "Hawaiian Air DC–9 Super 80 System Schematics," Drawing No. 7951806, Size: A, Code Ident. No. 88277, Revised Nov. 5, 1981; and drawing entitled "Engine, JT8D–200 Series Engine," Code Ident. No. 88277, Oct. 16, 1980.
Drawing entitled "JT8D–218 for the MD–90 Performance Items," 1983, J27918.25, R831006.
M. N. Nelson, "Development of Noise Reduction Concepts for the 707 Airplane," *J. Of the Acoustical Soc. Of America*, vol. 58, No. 1, Jul. 1975, pp. 144–154.

```
┌─────────────────────────────────────────────────────────────────────┐
│ REMOVE THE EXISTING NOSE COWL WITH BLOW-IN DOORS AND REPLACE         │
│     WITH ACOUSTICALLY-TREATED NEW, ENLARGED NOSE COWL                │
└─────────────────────────────────────────────────────────────────────┘
                                  ↓
┌─────────────────────────────────────────────────────────────────────┐
│    REMOVE NOSE COWL CENTER BODY AND REPLACE WITH A NEW,              │
│       ACOUSTICALLY-TREATED CENTER BODY LIGHT BULB SHAPE              │
└─────────────────────────────────────────────────────────────────────┘
                                  ↓
┌─────────────────────────────────────────────────────────────────────┐
│     INSTALL NEWLY-MANUFACTURED COMPONENTS TO RESPACE THE             │
│          INLET GUIDE WANE FORWARD 3.5" TO 5.0"                       │
└─────────────────────────────────────────────────────────────────────┘
                                  ↓
┌─────────────────────────────────────────────────────────────────────┐
│   INSTALL A NEW BLEED AIR DUCT FOR THE COMPRESSOR RELIEF VALVE       │
└─────────────────────────────────────────────────────────────────────┘
                                  ↓
┌─────────────────────────────────────────────────────────────────────┐
│ REMOVE FORWARD AIR REVERSER COMPLETE SYSTEM INCORPORATING            │
│ OIL COOLERS FOR THE TURBO COMPRESSOR AND CONSTANT SPEED              │
│       DRIVE; INSTALL A NEW DUCT SYSTEM COMPRISING OF:                │
│                                                                     │
│   A. BIFURCATED DUCTS L & R                                          │
│   B. CONSTANT SECTION DUCT L & R INCORPORATING OIL COOLERS           │
│      FOR THE TURBO COMPRESSOR AND CONSTANT SPEED DRIVE               │
│   C. TRANSITION DUCTS L & R ACOUSTICALLY TREATED                     │
│      TERMINATING AT THE COMMON NOZZLE                                │
└─────────────────────────────────────────────────────────────────────┘
                                  ↓
┌─────────────────────────────────────────────────────────────────────┐
│   REMOVE EXISTING NACELLE DOORS AND PANELS. REPLACE WITH:            │
│      A. A NEW FORWARD NACELLE DOOR L & R                             │
│      B. A NEW AFT NACELLE DOOR L & R                                 │
│      C. A NEW APRON L & R ALLOWING THE INSTALLATION                  │
│         OF THE NEW NACELLE DOORS                                     │
└─────────────────────────────────────────────────────────────────────┘
                                  ↓
┌─────────────────────────────────────────────────────────────────────┐
│  REMOVE THE CASCADE THRUST REVERSER WITH TRANSLATING SLEEVE          │
│                     AND REPLACE WITH:                                │
│      A. A NEW COMMON NOZZLE INCORPORATING A MIXER                    │
│      B. A NEW TARGET-TYPE REVERSER                                   │
│      C. AN ACOUSTICALLY-TREATED TAIL PIPE                            │
└─────────────────────────────────────────────────────────────────────┘
```

*FIG. 8*

TURBOFAN ENGINE WITH REDUCED NOISE

This is a Divisional of application Ser. No. 08/521,139, filed Aug. 29, 1995 (U.S. Pat. No. 5,706,651), which application is incorporated herein by reference.

BACKGROUND

Having a turbofan engine with reduced noise is important.

This invention relates to a turbofan engine for aircraft, the engine having reduced noise. In particular, the invention is concerned with a family of engines originally manufactured by Pratt & Whitney. In particular, these engines include the JT3D-3B, the JT3D-7 and the TF33 Engine, which includes the P-3/103, the P-5, the P-9, the P-100/100A and the P-102/102A Engines ("the JT3D family"). Such engines are commonly used on Boeing 707 aircraft, the Boeing KC135 and E3A aircraft, the Douglas DC8 aircraft and Lockheed C141 aircraft ("Aircraft").

Different techniques and systems are available to quiet an engine to reach different stages of noise reduction as defined by different governmental authorities. In particular, there are hush kits available to quiet Pratt & Whitney JT8D engines commonly used on Boeing 727 aircraft. Such an engine quieting system is the subject of U.S. Pat. No. 5,127,602 ("Batey"). The system uses a spacer and mixer to mix exhaust gas with fan air gas at the rear of the nozzle of the core engine. A cascade-type thrust reverser is used for thrust reverse conditions. Unlike the JT8D family, the JT3D family of engines are designed to exhaust fan air and turbine air separately to ambient air.

In other systems and with other engines, an annular pressure duct is used to direct fan air rearwardly to the rear zone of the exhaust nozzle. Such a system is applied on DC8 Sixty Series aircraft. In these cases, there is no internal mixing in the nozzle area of the exhaust air and duct air at the rear of the core engine. There is no common nozzle.

In some cases, such as the Douglas DC8-62/63 series aircraft and the Lockheed C141 aircraft, the fan air is directed to a plane just upstream of the turbine exhaust nozzle where it ducts to ambient air. In these cases, a common thrust reverser reverses both fan and turbine air. In other cases, such as the Boeing 707, Boeing KC135 and E3A aircraft and Douglas DC8-50/61 series aircraft, the fan air is directed only a short distance and exits to ambient air substantially forward of the turbine exhaust nozzle. In these cases where thrust reversing is desired, separate fan and turbine thrust reversers are required.

Furthermore, these engines have a bleed valve which, in certain situations of low power engine operation, particularly on approach to landing, is opened to bleed air from the core engine away from the thrust generating exit rearwardly of the core engine, perpendicular to the thrust axis of the engine. The opening of the bleed valve relieves very hot supersonic air flow and causes a substantial screeching noise and increases the noise characteristics noticeably in that operative state of the engine.

In the Applicant's experience, there is no system which exists for effectively quieting this JT3D family of engines in a manner to reduce the perceived noise level of the engines, especially low frequency jet mixing noise by at least three (3) noise decibels while maintaining the existing thrust levels.

There is a need to provide for the effective operation of such engines under appropriate thrust and operate under the appropriate noise-reduced conditions.

In particular, it is desirable to provide a turbofan engine with reduced noise and to provide a hush kit for retrofitting such engines which minimizes the disadvantages of known systems.

SUMMARY

By this invention there is provided a turbojet engine with reduced noise and a hush kit system for retrofitting an engine and creating a quieter engine which has advantages over known hush kit systems.

According to the invention, there is provided a noise-reduced turbofan engine comprising a core engine having two (2) spool axial flow fans, multi-stage compressors and multi-stage reaction turbines and a thrust of at least about 18,000 lbs. at sea level. These engines include the JT3D-3B, the JT3D-7, and TF33, which includes the P-3/103, the P-5, the P-9, the P-100/100A and the P-102/102A engines produced by Pratt & Whitney, East Hartford, Conn., having a thrust preferably between about 18,000 lbs and about 21,000 lbs. at sea level.

The fans are at an upstream end of the core engine for generating axial fan air flow. There are bypass ducts for receiving a major portion of the axial fan air flow from the fans. The ducts terminate at a common nozzle located at the outlet for exhaust gas from the engine.

The common nozzle has a mixing plane area for each of the fan air flow and for the exhaust gas, each in a range between 700 and 800 square inches. There is a mixer in the common nozzle assembly disposed axially to receive and exhaust the exhaust gas and fan air from the common nozzle to the tail pipe assembly. The plane area for the fan air is preferably in the range of about 750 to 780 square inches, and more preferably about 752 square inches. The plane area for the exhaust gas is preferably in the range of about 725 to 760 square inches, and more preferably about 727 square inches. The exit area of the mixer, namely the area of the common nozzle, is preferably about 1,400 to 1,500 square inches, and more preferably about 1,482 square inches. The static pressure of the fan exit and turbo exit is equalized for the engine pressure ratio of 1.7 to 1.86 and more preferably about 1.83 at the static takeoff conditions. The design is such that at lower engine pressure ratios the back pressure on the compressor fans and the turbine is not increased causing a decreased safety margin for engine stall while at the same time not decreased causing a loss in engine thrust.

A mixer has an upstream end and an annular mixer wall axially extending downstream therefrom. The wall is formed into a plurality of circumferentially alternating radially inward and radially outward lobes, the radially inward lobes defining cold chutes for radially inwardly diverting fan air and outward lobes defining hot chutes for permitting radially outward expansion of exhaust.

An annular mixer adapter is provided for fixing the mixer to a casing for the core engine in a position downstream of and coaxial with the core engine. A mixer transition contour plate has an upstream end for coaxial attachment to the downstream end of the core engine. This plate is an annular, axially extending transition contour plate for attachment to the upstream end of the mixer. The plate is shaped to aerodynamically conform to the mixer so as to effectively direct the fan air.

A thrust reverser is provided which is movable into a first position for converting axial flow of exhaust gas and fan air from the tail pipe assembly into reverse thrust. It is movable into a second stowed position for permitting the reverser doors to act as aerodynamic fairing for the nacelle afterbody.

The thrust reverser is a target-type system having opposing doors rotatable into the first position to block and divert the flow of exhaust gases from a primary nozzle of the core engine by means of a mechanical linkage to an hydraulic actuation system. An acoustic liner is provided for the nozzle surrounding the mixer.

An acoustically dampened nose cone, also known as an inlet centerbody, is provided for coaxial attachment to an upstream end of the core engine. The nose cone is light bulb-shaped. An inlet cowling, more preferably about 40" to 48" in length, is provided with a leading edge which is heated by engine bleed air for anti-icing with an acoustic liner comprising the inner air flow walls. In some cases where blow-in doors are presently provided in the inlet to supplement intake air at high thrust levels of the engine, the diameter of the inlet is somewhat enlarged and the blow-in doors eliminated.

The axial flow front fan is axially separated by a spacer, preferably about 3" to 5", an amount equal approximately to the axial depth of the blades of the fans. The inlet guide vanes, which direct inlet air to the first row of fan blades, is moved to a position, preferably in the range of 3" to 5" forward of its present location, and a new engine hub and oil-damped bearing installed.

The tail pipe assembly is also configured to have a relatively greater cross-sectional area in the exit for accommodating an increased volume in the flow stream leading from the common nozzle. The greater cross-sectional area is relative to the turbine exhaust area of an unmodified JT3D family of engines. The tail pipe exit plane is extended, preferably in the range of 6" to 18" to allow for mixing of the fan and turbine flows internally.

A bleed air valve of the engine is selectively operational to bleed air from the core engine when the valve is open. A duct is provided for directing bleed air into the mixing area of the common nozzle.

In another form of the invention, there is provided a noise reduction kit for modifying or retrofitting the JT3D family of engines, the kit including at least some of the components to achieve the common nozzle. Also included in the kit is the target-type thrust reverser. The various acoustic elements are provided and the different size cowling, the nose cone and the bleed valve duct are part of the kit.

The invention further includes a method of modifying an engine as defined to reduce noise with the kit. Such an engine would normally include a cascade-type thrust reverser. The method for modifying the engine includes removing components of the engine from the upstream and downstream ends of the core engine.

Thereafter, bypass ducts, some of which may have acoustical liners, are installed for receiving at least a portion of the axial fan air flow from the fans. The ducts terminate at a common nozzle located at the outlet for exhaust gas from the engine through bypass ducts terminating at a common nozzle. The common nozzle has a mixing plane area for each of the fan air flow and for the exhaust gas, preferably in a range between 700 and 800 square inches.

A mixer is installed forward of a tail pipe assembly disposed axially to receive and exhaust the exhaust gas and fan air from the common nozzle. The mixer is installed coaxially downstream to the core engine for radially diverting fan air and permitting radially outward expansion of exhaust gas to mix the fan air and exhaust gas.

An annular exhaust common nozzle is installed coaxially, between the downstream end of the core engine and a thrust reverser. The common nozzle extends the axial flow path of the mixed exhaust gas and fan air upstream of the reverser.

The cascade reverser is replaced with a target-type reverser having opposing doors rotatable into position to block to divert the flow of exhaust gases for generating reverse thrust.

The invention is further described with reference to the accompanying drawings.

DRAWINGS

FIG. 8 is a flow diagram representing a retrofit construction procedure for applying the hush kit components to a core engine.

DESCRIPTION

Figure 1:
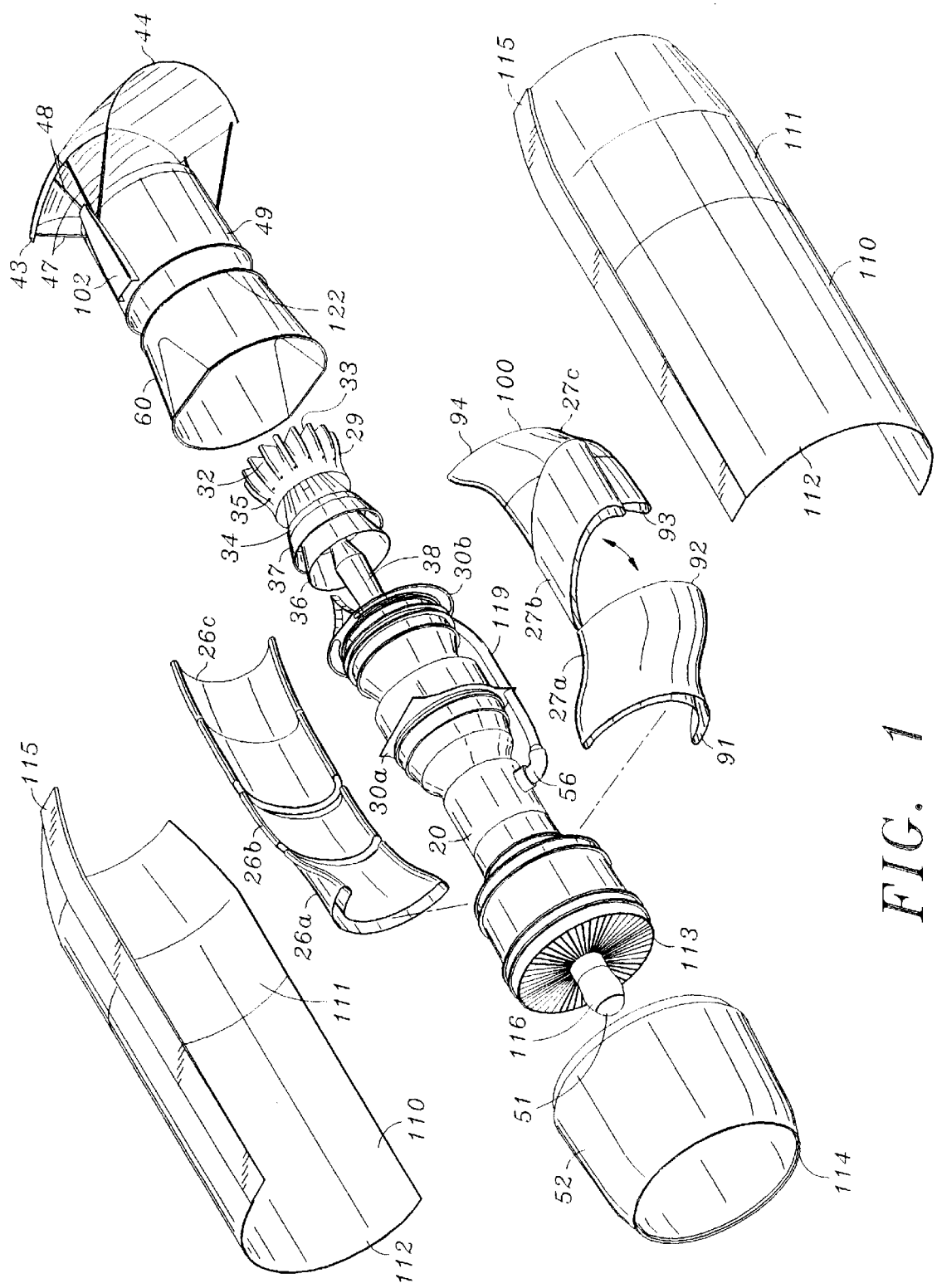
FIG. 1 is an exploded perspective top view of the components making up the core engine, and the hush kit.
Figure 2:
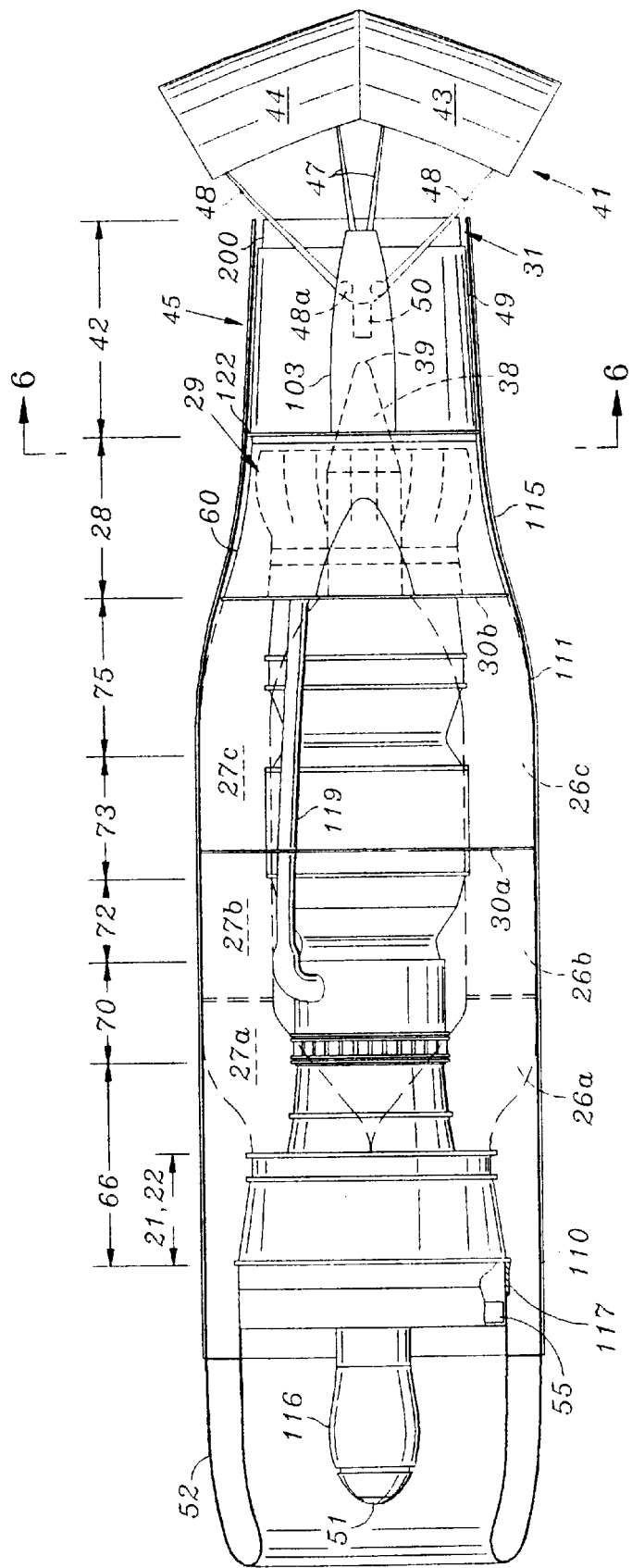
FIG. 2 is a bottom view of the core engine, with some hush kit components and the cowling shown in phantom, and the reverser is open.

A JT3D or TF33 core engine, as modified, is described as set forth below:

I. OVERVIEW
  A. Engine and Hush Kit Generally
  B. General Procedure for Retrofitting Engine
  C. Noise Suppression Hush Kit
II. CORE ENGINE
  A. Description and Operation
    1. General
    2. Operation
    3. Compressor Section
    4. Combustion Section
    5. Turbine And Exhaust
    6. Front Accessory Section
  B. Front Compressor Section
    1. Front Compressor Assembly
    2. No. 1 Bearing Supports and Inlet Case Assembly
    3. Inner Shroud
    4. Outer Shroud
    5. Front Compressor Cases
      a. Front Compressor Case and Vane Assembly
      b. Fan Discharge Case Assembly
      c. Front Compressor Rear Case Assembly
    6. Front Compressor Stator Vanes and Shrouds 7. Front Compressor Rotor
C. Compressor Intermediate Section
D. Rear Compressor Section
  1. Vane and Shroud Assemblies
  2. Air Seals
  3. Rear Compressor Rotor
  4. Diffuser Section
III. AFT CENTER BODY
IV. FAN AIR DUCTS
  A. General
  B. Constant Section and Transition Duct
V. COMMON NOZZLE
VI. MIXER
VII. MIXER ADAPTER RING—SPACER—TRANSITION RING
  A. Mixer Installation in Common Nozzle
VIII. MIXER TRANSITION CONTOUR PLATE (FAIRING)—FAN EXHAUST DUCT SEGMENT
IX. FAN AIR SHROUD
X. THRUST REVERSER
  A. Mounting Ring, Adapter, Spacer—Exhaust Transition Duct Assembly
  B. Target-Type Thrust Reverser
  C. Thrust Reverser: Structural Description
XI. COWLING
  A. General
  B. Nose Cowl
  C. Cowl Doors
  D. Aft Cowl
XII. TAIL PIPE ASSEMBLY
XIII. INLET BULLET: CENTER BODY
XIV. RESPACED INLET GUIDE VANE (RIGV)
XV. COMPRESSOR BLEED
XVI. EXIT NOZZLE ASSEMBLY
XVII. GENERAL
I. OVERVIEW
  A. Engine and Hush Kit Generally A noise-reduced turbofan of the JT3D family of engines comprises a core engine 20 having two spool axial flow fans 21 and 22, multi-stage compressors 23, 24 and 25 and multi-stage reaction turbines and a thrust of at least about 18,000 lbs. at sea level. More specifically, the generated thrust is 18,000 to 21,000 lbs. take-off power at sea level on a standard day. The family of JT3D engines manufactured by Pratt & Whitney consists of the JT3D-3B, the JT3D-7 and the TF33 engine, which includes the P-3/103, the P-5, the P-9 and the P-102/102A engines. The JT3D family of engines is commonly used on Boeing 707, the Boeing KC135 and E3A aircraft, Douglas DC8 series aircraft, and Lockheed C141 aircraft ("Aircraft").

The fans 21 and 22 of the engine are located at an upstream end of the core engine for generating axial fan air flow. There are two bypass ducts 26 and 27 on each side of the engine 20 for receiving at least a portion of the axial fan air flow from the fans 21 and 22. The ducts 26 and 27 collectively surround the core engine 20 and terminate at a common nozzle 28 located at the outlet 29 for exhaust gas from the engine 20. Each of the bypass-ducts 26 and 27 is composed of three separable sections 26a, 26b and 26c; and 27a, 27b and 27c on each side from the front to the rear of the core engine 20. The ducts 26 and 27 are removable, in part or whole, as necessary when the core engine 20 needs maintenance. There are two spaced fire walls 30a and 30b located transversely of and about the engine 20.

There is a mixer 29 in the common nozzle 28 which is upstream of a tail pipe assembly generally shown as 42. The tail pipe assembly 42 includes multiple components to axially receive and exhaust the exhaust gas and fan air from the common nozzle 28 to the exit nozzle 31.

Figure 6:
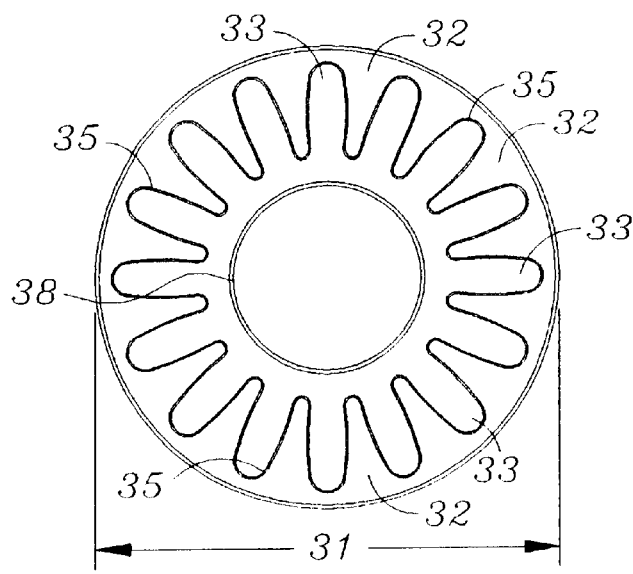
FIG. 6 is a rear end view of the engine along lines 6—6 showing the common nozzle area and the rear of the mixer.
Figure 7:
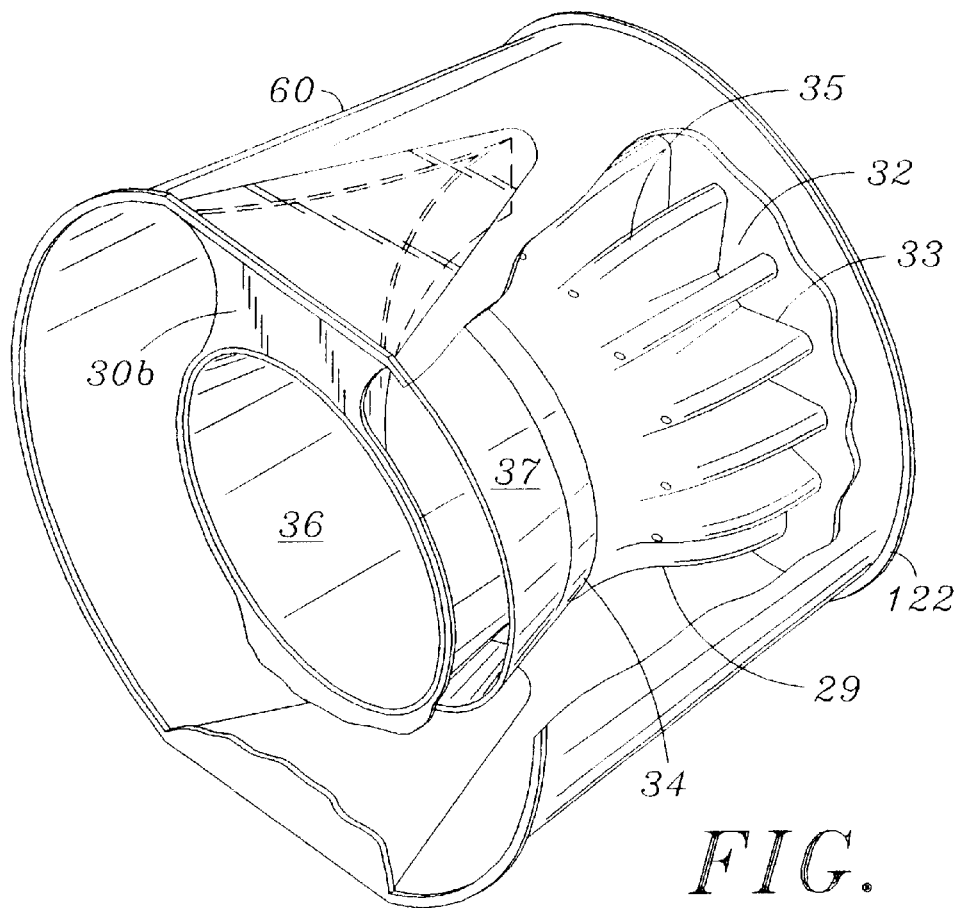
FIG. 7 is a perspective view, with portions broken away, showing the assembled mixer, contour plate and adapter for forming the common nozzle.

The common nozzle 28 has a mixing plane area for each of the fan air flow and for the exhaust gas. This is shown in FIG. 6, which represents a view of the mixer from the aft end. Each plane is in a range between 700 and 800 square inches.

The plane area for the fan air 32 is formed effectively by the area of the lobes of the mixer 29 receiving the cold fan air, and is in the range of about 750 to 780 square inches, and is preferably about 752 square inches. The plane area for the exhaust gas 33 is formed by the lobes of the mixer 29 for receiving the hot gas, and is about 725 to 760 square inches, and preferably about 727 square inches. The plane area of the common nozzle 28, as defined by both these plane areas 40, is 1,482 square inches. The diameter 31 of the exit nozzle 200 is preferably between about 37 inches to 39 inches, and more preferably, 38.88 inches. The mix of fan air and hot gas is about 80%.

Figure 9:
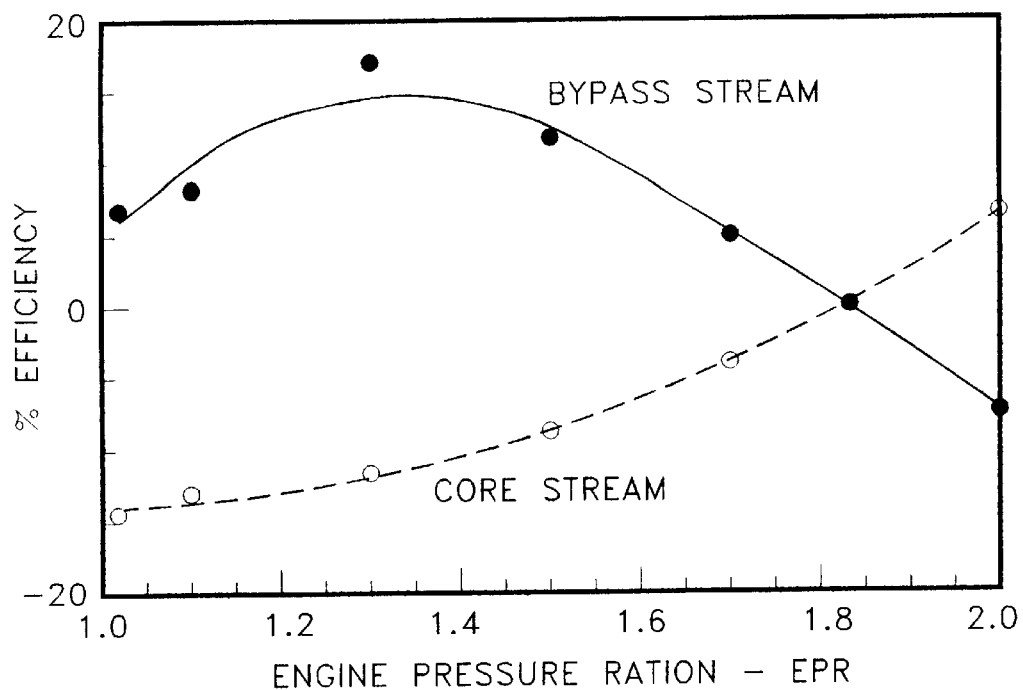
FIG. 9 is a graphical representation showing the changes in corrected flow (%) in relation to the interacting bypass or duct corrected fan air flow in relation to the core stream or exhaust air flow as a function of engine pressure ratio (EPR) at sea level static conditions.
Figure 10:
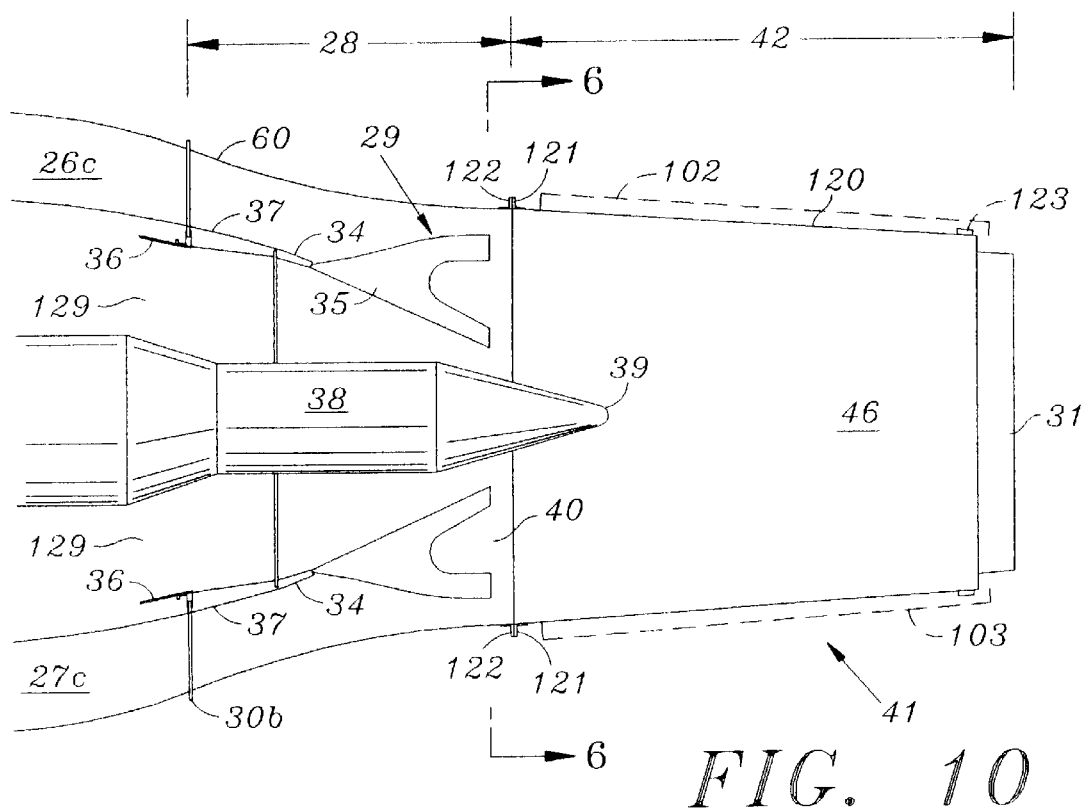
FIG. 10 is a side view of the common nozzle showing the mixer in relation to the target-type thrust reverser.

The effect of the common flow accomplished by the common nozzle 28 on the engine operating lines can be assessed by evaluating the relative changes in corrected flow (W/T/P) for the core and bypass streams, as illustrated in FIG. 9. A common flow nacelle configuration is selected to maintain the same engine operating point as the separate flow nacelle at static take-off, 1.83 engine pressure ratio ("EPR"). Below take-off power, there is a significant increase in the effective fan nozzle area and a significant decrease in the core nozzle area. The opposite is true above 1.83 EPR. Based on limited influence coefficient information, these area shifts result in a loss in high pressure compressor stability margin at low power and a loss in fan and low pressure compressor stability margin at high power.

The mixer 29 has an annular mixer wall 35 axially extending downstream therefrom. The wall 35 is formed into a plurality of circumferentially alternating radially inward and radially outward lobes 32 and 33, respectively. The radially inward lobes 32 define cold chutes for radially inwardly diverting fan air. The outwardly directed lobes 33 define hot chutes to permit radially outward expansion of exhaust. The particular JT3D family of engines can have different numbers of lobes in the mixer, preferably having 14 to 18 lobes. The JT3D family of engines preferably has a 16-lobe mixer. A JT8D-200 model engine uses a 12-lobe mixer.

An annular mixer adapter 36 is provided for fixing the mixer to the exhaust outlet 129 for the core engine in a position downstream of, and coaxial with, the core engine 20.

A mixer transition contour plate is provided 34 for coaxial attachment to the downstream end of the transition contour plate 37 of the core engine 20. There is an annular, axially extending transition contour plate 37 for attachment to the upstream end of 34. The plates are shaped to aerodynamically conform to the mixer to direct fan air. This is different to and additional to the mixer adapter 36 which fits within the contour plate 37.

The rear portion of the core engine 20 includes an aft center body 38. This is extended to project into the mixer 29 and the end of 39 projects beyond the aft end 40 of the mixer 29.

A target-type thrust reverser 41 is provided to be movable into a first position for converting axial flow of exhaust gas and fan air from the tail pipe assembly 42 into reverse thrust. It is movable into a second stowed position which permits the reverser doors 43 and 44 to act as aerodynamic fairings for the nacelle afterbody 45.

The target-type thrust reverser system 41 has opposing doors 43 and 44 rotatable into a position to block and divert the flow of exhaust gases from a nozzle assembly 46 of the common nozzle 28 by means of a mechanical driver linkage 47 and roller linkage 48 to an hydraulic actuation system 50. There is an acoustic liner for nozzle assembly 46 that serves as the exhaust duct section of the engine nacelle package and consists structurally of a welded sandwich barrel tail pipe 49 having the inner face perforated for noise abatement. This barrel tail pipe 49 provides support for the thrust reverser generally indicated as 41.

An acoustically dampened nose cone 51 is provided for coaxial attachment to an upstream end of the core engine 20. The nose cone 51 is light bulb-shaped.

An inlet cowling 52 has a relatively increased diameter inlet cowling relative to an unmodified engine where blow-in doors are presently used.

The axial flow fan blades 21 and 22 are axially separated by an amount equal approximately to the axial depth 53 of the fan blades 21 and 22. The inlet guide vane 55 for the front fan 21 is moved forward of its present position, preferably in the range of about 3" to about 6", and preferably about 5", and a new engine hub and damped bearing installed. This is termed a "Respaced Inlet Guide Vane" ["RIGV"].

The tail pipe assembly 42 including nozzle 31 is configured to have a greater cross-sectional area in the exit for accommodating an increased volume in the flow stream from the common nozzle 28.

A bleed air valve from the core engine 20 is selectively operational to bleed air from the core engine 20 when the valve is open. There is a duct 56 for directing bleed air into the common nozzle 28. The duct 56 for the bleed air runs parallel to and adjacent to one of the ducts 26 or 27 for the fan air. It ends at the common nozzle 28 and particularly through a port provided in the fire wall 30b adjacent to the area of the common nozzle 28.

B. General Procedure For Retrofitting Engine

A method of modifying the family of JT3D engines is to reduce noise with the kit includes removing a cascade-type thrust reverser, which is normally part of the JT3D engine installation. It is replaced with a target-type thrust reverser. The method includes removing other components of the engine from the upstream and downstream ends of the core engine. The procedure is described in relation to FIG. 8.

Bypass ducts 26 and 27 for receiving the axial fan air flow from the fans are installed. The ducts terminate at a common nozzle 28 located at the outlet for exhaust gas from the engine through bypass ducts 26 and 27 terminating at the common nozzle 28.

A mixer 29 is installed in a common nozzle assembly to receive and exhaust the exhaust gas and fan air from the common nozzle to the exit nozzle. The mixer 29 provides for radially diverting fan air inwardly and for permitting radially outward expansion of exhaust gas to mix the fan air and exhaust gas. The mixer 29 is installed coaxially downstream to the core engine 20.

An annular exhaust transition duct, which is formed between a fan air shroud 60, and contour plates 34 and 37 is installed coaxially in a location relatively between the exit planes of 26C and 27C and the tail pipe assembly 42. The shroud 60 also extends the axial flow path of the mixed exhaust gas and fan air upstream of the reverser 41.

Figure 3:
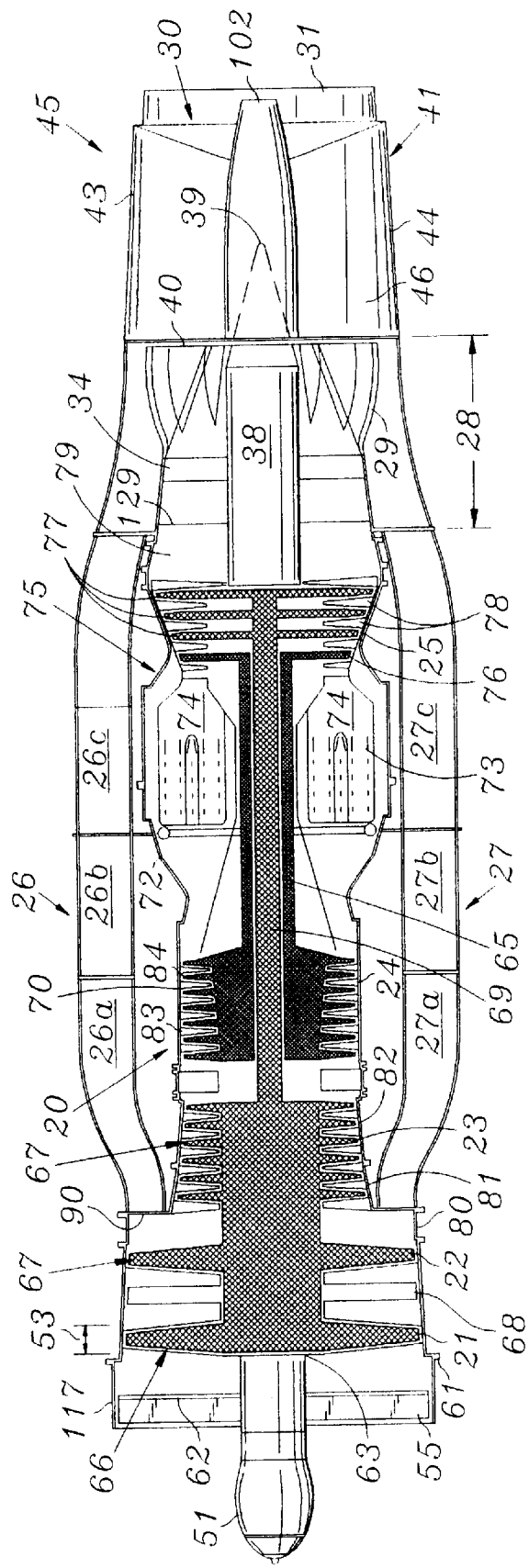
FIG. 3 is a sectional top view of the core engine and sectional views of the duct to the common nozzle area of the mixer, and the reverser is closed.
Figure 4:
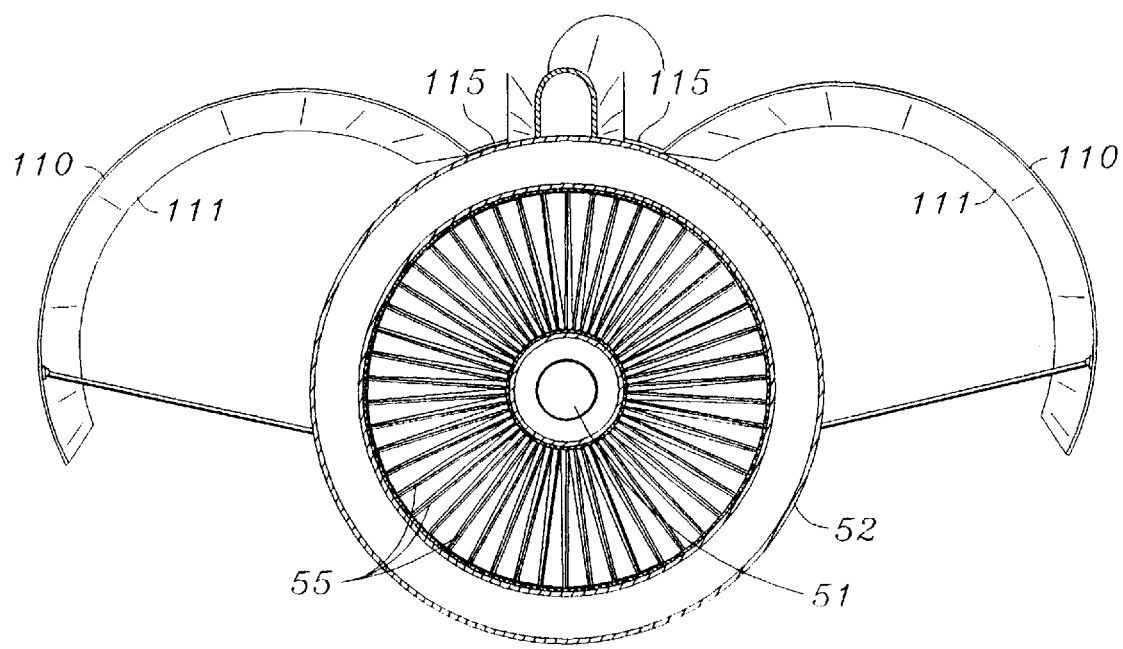
FIG. 4 is a cross-sectional front view from the nose showing the engine.
Figure 5:
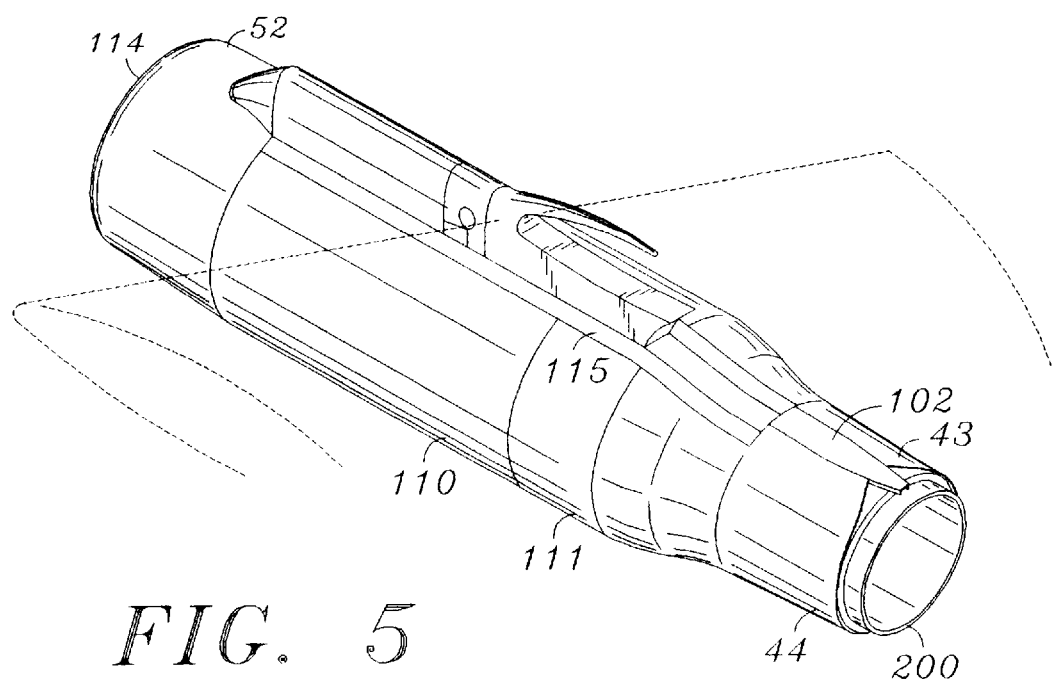
FIG. 5 is a partial perspective view from the top showing one of four engines mounted below a partial wing, shown in phantom, on support pylons.

The target-type reverser 41 has opposing doors 43 and 44 rotatable into position to block and divert the flow of exhaust gases for generating reverse thrust, and a stowed position permitting the reverser doors to act as aerodynamic fairings for the nacelle afterbody 45. FIG. 3.

C. Noise Suppression Hush Kit

The major components for the hush kit for the JT3D family of engines are set forth below.

The elements of the noise suppression kit are sized to fit a two-spool axial flow, turbofan engine with multi-stage compressors and fans driven by multi-stage reaction turbines designed for operation with fixed area nozzles for primary and fan discharge.

The components are:

1. Fan Air Ducts—3 components on each of two sides of the Core Engine.
2. Common Nozzle—This new component to the JT3D family of engines is for a Nozzle for the primary (exhaust) gas and for the fan air discharge.
3. Mixer to assist the Common Nozzle.
4. Mixer adapter: This is a Spacer or Transition Ring.
5. Mixer Transition Contour Plate. This is a fairing, namely a Fan Exhaust Duct Segment.
5. Bleed Valve Duct terminating into the Common Nozzle.
6. Common Nozzle Duct Assembly for installation of the Thrust Reverser. This has a Thrust Reverser Mounting Ring or Adapter.
7. Target-Type Reverser.
8. Acoustic Nozzle Assemblies.
9. Acoustically treated, lengthened and diametrically enlarged Nose Cowl with no blow in doors for those Aircraft that originally were designed with Nose Cowls having blow-in doors.
10. Acoustically treated, lengthened Center Body: Bullet—light bulb shape
11. Respaced Inlet Guide Vane (RIGV).
12. Cowl doors—Apron.

II. CORE ENGINE

The core engine or power plant of the JT3D family of engines is a two-spool axial flow turbofan engine with multi-stage compressors and fans driven by multi-stage reaction turbines. The following specifications are applicable to such an engine:

a. 18,000 to 21,000 lbs. take-off static thrust at sea level.
  b. Dual axial 15 to 16 stage compressor, 4 stage turbine and 8 annular combustion chambers.
  c. Principal dimensions:
    1. Length 136" to 143"
    2. Width 53" to 55"
    3. Height 56" to 60"

A. Description And Operation
  1. General

The JT3D family of engines is made up of engines which operate similarly to all turbofan versions of a gas turbine engine. Two front compressor stages 21 and 22, respectively, have vanes and blades which are considerably larger than other stages and are commonly referred to as a "fan". This "fan" provides two separate air streams.

A primary, or inner air stream travels through the engine 20 and the internal devices operate to generate pressures and gases in the exhaust nozzle 46 and thereby provide propulsive force. This stream is the exhaust stream. Secondary, or outer air stream is mechanically compressed by the "fan" as it enters the engine and is normally ducted to the outside engine 20 a short distance from "fan". This secondary air stream, termed the "fan air", adds to propulsive force similar to a propeller. Although the "fan" has an effect of a geared propeller, it is driven at engine speed. The efficiency of the engine is increased by the dual air streams, and since a smaller percentage of available energy is diverted to the "fan", thrust-specific fuel consumption is lower than that of comparable turboprop engines.

The JT3D family of engines consists of axial flow turbofan engines having a fifteen to sixteen-stage split compressor, an eight-can combustion chamber, and a four-stage split turbine. With all the engine-provided accessory components installed (aircraft component mounting brackets excepted), each of the engines of the JT3D family of engines weighs approximately 4,260 to 4,900 pounds.

2. Operation

Air enters the engine 20 through the compressor inlet case assembly. The airframe inlet duct is attached to the front of the inlet case. This inlet case assembly 61 is provided with vane-type multi-purpose struts 62 which transmit No. 1 bearing 63 loads to the outer case structure, conduct anti-icing air and lubricating oil to the inner diameter of the engine, and direct air to the front compressor section.

3. Compressor Section

The compressor section is of split-type and consists of two rotor assemblies 69 and 65, respectively. Each rotor assembly 69 and 65 is driven by an independent turbine, and each rotor 69 and 65 is free to rotate at its best speed. Since it is necessary to rotate only one of these units during starting operation, selection of a small rear compressor permits use of a smaller starter.

Air from the inlet guide vane 55 and shroud assembly enters the front compressor 66, which consists of eight rotor stages 67 and seven stage stator vanes 81. The gas path of this compressor has a constant inside diameter and decreasing outside diameter. This compressor is the larger of two, and provides initial compression of air. Rotating parts are connected by a drive shaft 69 which passes through the inside of the rear compressor rotor 65 and drive shaft to second and third stage turbines.

Between the front compressor 66 and rear compressor 70 is an intermediate case. It has an automatic arrangement for bleeding front compressor air. This is to improve acceleration characteristics of engine inlet vanes (9th stage) to transmit No. 2 and No. 3 bearing loads to the outer case, conduct supply and return oil to bearings and to the outer case, conduct supply and return oil to the bearings, and direct compressed air from the front compressor 66 to the rear compressor 70.

The rear compressor 70 has seven rotor stages 84 and six vane stages 83. It has a constant outside diameter and increasing inside diameter, and is driven by a first stage turbine through an independent shaft concentric with the front compressor drive shaft. Aft of the rear compressor 70 is a diffuser case 72.

The compressor exit guide vanes at the front of the diffuser case 72 straighten air which is then expanded for entry into combustion chambers 73. Struts in the case transmit No. 4 and No. 5 bearing loads to the outer portion of the case. In addition, these struts conduct bearing oil pressure and suction lines and provide high pressure air for such engine functions as anti-icing. They also provide a source of clean air for aircraft pressure needs. A water injection manifold is mounted on the front flange. Coolant is dispersed through sixteen curled tubes mounted on the periphery of the diffuser case, through mating holes in the case and injected into the air stream. The outside contours of the compressor and diffuser sections give the engine its "wasp waist" and at the same time provide convenient location for an accessory section.

The fuel manifold, which consists of eight circular clusters of six fuel nozzles, is located in the diffuser case 72 annulus and injects fuel into the air stream in governed proportions. At this point, the air is channeled into eight portions for burning with fuel in eight combustion chambers 73 and 74.

4. Combustion Section

The combustion section consists of eight separate cans arranged annularly, namely the "cannular burners". The chambers 73, as viewed from the rear of the engine, are numbered in a clockwise direction starting with the uppermost chamber as No. 1. These chambers are connected by cross-over tubes. The compressed air, its velocity decreased and now with fuel particles injected, is lighted initially by spark igniters installed in the No. 4 and No. 5 combustion chambers. After "light-up", the flame is perpetuated by construction of the combustion chamber and heat generated by previous combustion. Exhaust gases pass through the combustion chamber outlet duct.

5. Turbine And Exhaust

The turbine nozzle case 75 houses the first three stages of a four-stage turbine and is aft of the combustion section 73. The first stage 76 drives the rear compressor 70, and the second, third, and fourth stages 77 drive the front compressor 66. The turbine nozzle case 75 also contains four turbine exhaust nozzles. The nozzles are made up of a series of stationary vanes 78 which direct exhaust gases through turbine blades and into the turbine exhaust case.

To the rear of the turbine nozzle case 75 there is a turbine exhaust case 79 which houses a fourth stage turbine disk and blades and through which exhaust gases are ejected from the engine. The turbine exhaust case 79 also supports the No. 6 bearing and the No. 6 bearing oil sump.

6. Front Accessory Section

The front accessory section consists of one assembly, and front accessory drive support. The case of this assembly is made of magnesium. Sixteen bolts secure the front accessory support to the No. 1 bearing support. The front accessory support has one mount pad on its front face. This pad has provisions for mounting and driving the tachometer.

The No. 1 bearing scavenge pump is mounted on its lower rear face of support. The air and oil for bleed control are brought out of the No. 1, which is externally splined, is inserted, with the "o" ring seal around it, into the front compressor front hub engaging internal spline in hub. It is retained by the same nut that holds the No. 1 bearing inner race in position. The front accessory drive gear meshes with and drives the tachometer drivegear, the No. 1 bearing scavenge pump drive gear.

B. Front Compressor Section

1. Front Compressor Assembly

The front compressor, which is housed in the front compressor front and rear cases, consists of a rotor composed of eight rows of blades 67 and a stator assembly containing eight rows of vane 81 and shroud assemblies located between successive stages of blades. The first two rows of blades 67 are considerably larger than the rest and are referred to as "fan" blades 21 and 22.

There is no second stage stator and no third row of blades. At this point, the air stream is separated into primary and secondary streams. Separation is achieved by use of a spacer between the second and fourth stage blades. The primary air stream is directed internally by a third stage stator while the secondary air stream is exhausted through exit struts. Numbering of the blade stage from the front to the rear is Nos. 1 and 2 and 4–9, and the numbering of the stator stages is Nos. 1 and 3–8. The ninth stage stator vanes are incorporated in the intermediate case.

The third stage vane and shroud assembly is of single piece construction, whereas the fourth through eighth stages are of split type. Spacers of the fourth through eighth stages are integral. The inner shrouds from the seal ring for two air seals are on the outer diameter of each rotor.

The compressor is driven by the shaft 69 from the second, third, and fourth stage turbines. Its rotational speed is roughly two-thirds the speed of the rear or high-speed compressor 70. Its function is to provide initial compression to air that passes through the engine 20 and transmits this air to the rear or high-speed compressor 70. Stator vanes 68 and rotor blades 67 diminish in size and increase in quantity from the front to the rear of compressor. This matches decreasing volume of air as the pressure of air rises.

The front accessories are driven by a gear attached to the front hub of the front compressor rotor. The rear hub of the front compressor contains the front compressor drive turbine shaft coupling.

The rear hub of the front compressor rotor is supported by a double ball bearing (No. 2). The two halves of the No. 2 bearing (front compressor rear) are separated by an oil baffle in which drilled holes direct oil to the forward and aft sections of the double bearing. The No. 3 bearing (rear compressor front) inner race and rollers are mounted on the end of the rear hub. The oil seal on the rear end seals the bearing compartment from the engine air stream.

The front hub, rotor is supported by a roller bearing (No. 1), the liner of which is in the No. 1 bearing housing. The oil seal on the front end seals the bearing compartment from the engine air stream. The bearing support is secured to the inlet case assembly and forms the assembly.

2. No. 1 Bearing Supports and Inlet Case Assembly

These assemblies are discussed together. Supports are for the mounting in the inner diameter of the inlet case assembly, vanes of which, carry the structural load of the No. 1 bearing (front compressor front) from the inner shroud to the outer shroud.

The inlet case assembly consists of hollow titanium vanes 55, incorporating foam rubber. stiffeners in center bays, that are inserted between hollow, double-walled titanium inner and outer shrouds. Each vane 55 extends from the inner wall of the inner shroud to the outer wall of the outer shroud. Also, vanes 55 are welded to the outer wall of each shroud. There are holes in the side walls of the vanes 55 that are between the shroud walls, and this forms passage for the flow of anti-icing air. The left and right anti-icing tubes feed heated air, when desired, into the outer rim of the shroud assembly opposite the eight and four o'clock struts.

Some vanes 55 have tubes inside. These are for oil, breather and bleed valve control air lines. The No. 1 bearing oil pressure and oil return tubes are located in the seven o'clock and five o'clock struts, respectively. The purpose of these vanes 55 is to cause air to enter compressor rotor blades 66 at the best angle for best compressor operation and to transport structural load.

3. Inner Shroud

The inner shroud, being of double-wall construction, provides for the passage of anti-icing air that has flowed inward through the guide vanes. The oil and air tubes that pass through the vanes 55 have fittings mounted on the inner wall of the inner shroud. On the front edge of the inner shroud, holes are drilled and tapped to hold bolts that secure the No. 1 bearing housing and compressor inlet air seal assembly. The front accessory front support is bolted to its forward face. Anti-icing air outlet holes are also on the front edge of the shrouds. The No. 1 bearing oil seal is bolted at its outer diameter to a compressor inlet vane, inner shroud rear flange.

4. Outer Shroud

The outer shroud, being also of double-wall construction, provides for the passage of anti-icing air. The outer wall of the outer shroud forms support for outer fittings of tubes that pass through some vanes 55. The anti-icing air inlet fitting is also in the shrouded outer wall. The pressure probe fitting passes through both walls of the shroud to protrude into the air stream between the vanes 55. The front rim of the outer shroud is drilled and tapped to receive bolts which will hold the airframe, air inlet duct. The rear rim of the outer shroud is drilled and tapped to receive bolts that hold the shroud to the front compressor case.

5. Front Compressor Cases

There are three front compressor cases, namely: the front compressor case and vane assembly 61, the fan discharge case assembly 80, and the compressor rear case assembly 82. The front compressor case 80, 61 and 82 carry structural load from the engine. These cases 80, 61 and 82 decrease in diameter from front to rear to match decreasing diameters of stator rings.

a. Front Compressor Case and Vane Assembly

The front compressor case and vane assembly 80 attaches to the rear flange of the compressor inlet case 61 and front flange of the fan discharge case 81. In the approximate center of the case, riveted to internal flanges, are titanium first stage stator vanes. At the inner shroud of vanes, an aluminum stage air sealing ring is riveted. The inner shroud is constructed of titanium. From the forward internal flange to the inlet case, the front airflow duct is inserted. From the rearward internal flange to the fan discharge case forward flange, the rear airflow duct is inserted.

b. Fan Discharge Case Assembly

Attached to the rear flange from the compressor case, and further attached to the van assembly by bolts and pinned to the rear airflow duct, is the fan discharge case 80. This case is constructed of stainless steel and consists of an outer shroud and an inner case with thirty-eight steel struts between them. The struts are secured in an inner case by a riveted locking plate at the rearward end and wired to a fairing retaining screws at the forward end.

c. Front Compressor Rear Case Assembly

Attached to the rear innermost flange of the fan discharge case and to the forward flange of the intermediate case is the compressor rear case assembly 82. Welded to it internally are supports for the vane and shroud assemblies.

6. Front Compressor Stator Vanes and Shrouds

The first stage stator vanes 68 were discussed above under the front compressor case and vane assembly. There is no second stage stator. The third and fourth stage rows, or statuaries, are made of aluminum. These vanes 68 are riveted into aluminum shroud rings. The fifth through eighth stator vanes 68 are made of stainless steel and are welded into steel shroud rings. All shroud rings are wide enough to form spacers which permit compressor blades 67 to rotate. Statuaries are pinned to inner shrouds to which are attached riveted inner air seal platforms. The third stage stator vanes and shroud are built into a single circular assembly which is held stationary by a flange inserted between the fan discharge case 81 and the front compressor rear flanges. The fourth through eighth stage stator vanes and shrouds are split and are prevented from rotating by being pinned to each other and to a third stage vane and shroud. When assembled, rings are held in the engine by shoulders on the inside of the front compressor rear case.

The angle at which vanes 68 are mounted in shrouds is set to feed air into the following row of rotor blades 67 to give the best compressor efficiency at operating speed. Stator vanes 68 decrease in size from front to rear to match the decreasing volume air and decreasing size of the rotor blades 67.

7. Front Compressor Rotor

The front compressor rotor 66 consists of two hubs, seven disks, seven spacer assemblies, eight rows of blades 67, two sets (sixteen each) of tie rods and associated hardware. Each row of blades 66 is inserted into undercut slots in its disk. They are held in place by locks inserted under blades 66 and bent to secure. The blades 66 do not have a tight fit, but rather are seated by centrifugal force during engine operation. The front hub forms the disk for the first row of blades 66, but the rear hub is a separate unit that is held fast to the rearward face of the seventh stage disk by tiebolts. Spacers between the disks are internally reinforced with tubes. Tiebolts run through these tubes and through disks. These spacers have two knife-edges on the OD. These run against seal platforms on the stator vane inner shroud, which was previously described. An exception to the above is a large spacer between the second and fourth stage compressor blades. This serves as a means of joining the "fan" section to the remainder of the compressor and, in so doing, provides needed space in that area. Each disk has twenty-four holes in its flange. Sixteen are for tierods and eight are for balancing weights, when needed.

The front hub has a lip on its forward face, and the second stage disk has a similar lip on its rearward face to which balance weights can be added when assembly is complete. The smaller set holds the first two stages of blades together, while the longer set holds together the third through eighth stages. Both sections are joined together by a spacer, as previously mentioned. Rotor blades 67 decrease in size from front to rear. The first two stages of blades 66 are considerably larger than the rest and form the fan stages 21 and 22. The angle of each row of blades 66 is set to give best efficiency at operating speed. The rear hub flange has large holes to allow some ninth stage air into the compressor rotor. This air serves the dual purpose of providing bearing seal pressurizing and cooling. The front compressor rotor consists of hub (No. 1 hub only) disks, and blades 21 and 22, all of which are made from titanium. The No. 2 hub is made of steel.

C. Compressor Intermediate Section

Forward mounting points are on an intermediate case 70 which is attached to the rear flange of the front compressor case 82. A locating pin is used at the top center between the two flanges. An intermediate case 70 surrounds the rear compressor, but is not considered as part of it. It serves to separate low pressure from the compressor from high pressure in the rear compressor 72 and serves a structural function of joining external cases. The intermediate case 70 is of steel construction and has a double wall on the forward end. The guide vanes are welded from the outer wall, through the inner wall and extend into the shroud ring. The front flange of the case is drilled and tapped for bolts that attach it to the front compressor case 82, and the rear flange is drilled. Nuts are spun into holes for bolting the diffuser case 72 and the intermediate case 70 together.

An oil breather pad is located between the mounting flanges at approximately the two o'clock position. An oil tube fitting is at the six o'clock position between the mounting flanges. Toward the rear of the case 70, a hole is provided for air bleeding and air bleed valve mounting. On the JT3D-7 and TF33 (DSLG) model engines of the JT3D family of engines, this is located in the upper-left quadrant. On the JT3D-7 and TF33 (BG) model engines of the JT3D family of engines, it is located in the lower-left quadrant.

Thirty vanes on the inside front of the case serve as air inlet guide vanes to the rear compressor 70. They are hollow steel vanes with openings in their side walls at the outer end. These openings, together with the double wall of the case, form a breather passage from the upper breather connections on the case to the lower opening. Inlet vanes are welded to the No. 3 bearing support whose outer configuration is shaped to form an inner ring for these vanes. At the front (inner) and the rear (outer) ends of this support, bolt circles are provided to receive bolts to hold the diagonal and rear bearing supports. A hollow tubular seal is used at the rear (outer) bolt circle. One of the round plates is flat and forms a diagonal brace between the front and the rear support. The tapered plate has large holes at the top and bottom to allow air breather and passages for oil tubes. Extensions of the front and rear supports form seal housings.

The bearing housing is integral with the center support. The stepped edge seal ring is bolted to support at the outer diameter of the rear support plate. This ring, together with its mating knife-edge seal, minimizes air leakage out of the front end of the rear compressor 70. The area inside ring and behind rear support plate is exposed to high pressure air extracted from the twelfth stage of compression. The air pressure outside seal ring is from the ninth stage.

D. Rear Compressor Section

The rear, or high, compressor 70 is driven by a hollow shaft 65 from the front stage of turbine 76. Its function is to compress further air delivered by the front compressor and then feed this air into the diffuser case 72 and burners 74.

The rear compressor 70 consists of a stator having six rows of vanes 83 and a rotor shaft 65 having seven rows of blades 84. Exit guide vanes are mounted in the diffuser section 72. In function, these are part of the compressor, but because of their structural location, they are discussed under the section regarding the diffuser.

1. Vane and Shroud Assemblies

There are six vane and shroud assemblies 83 in the rear compressor 70. The vanes 83 reduce in height from the front to the rear of the compressor 70. The outer side diameter of the air passage formed by these assemblies is constant, decreasing size of the vanes 83 is accomplished by increasing the diameter of the inner shroud rings. The vanes 83 are made of steel and are brazed to the inner shroud and pierced through the outer shrouds on the first five vane and shroud assemblies 83. The spacers separating assemblies are integral. The sixth stage does not provide spacing. However, this is furnished by the seventh stage located in the diffuser case 72. Between each shroud, dowel pins are used to lock series of shrouds together. The rear shroud (seventh) is pinned to the seventh stage outer shroud to prevent rotation. The edge of each spacer rests against the case shoulder to center the assembly.

2. Air Seals

The inside shroud of each row of vanes 83 has a steel ring, with a small step riveted to it on its inside face. Two knife-edge seals on each rotor spacer ride free of steps forming an air seal between the compressor stages.

3. Rear Compressor Rotor

The rotor shaft 65 includes seven rows of blades 84 on disks, two hubs, six spacer assemblies, sixteen tie-rod bolts with nuts and washers. A knife-edge seal ring is riveted to lip on the forward face of the tenth stage disk. This seal ring rides free of a platformed seal which was referred to in the compressor intermediate case discussion.

Each row of blades 84 is inserted into undercut slots in its disk. They are held in place by locks inserted under blades 84 and bent to secure. The blades 84 do not have a tight fit, but rather are seated by centrifugal force during engine operation.

Every disk has 32 holes in its flange. Sixteen of the holes are for tie bolts, and the remaining 16 are for balancing weights when needed. The entire assembly is held together by tie bolt heads on one end and a nut and washer on the other end.

The spacers between disks are internally reinforced with tubes. Tie bolts run through tubes and spacer internal flanges, as well as disk flanges.

Neither a front nor rear hub is integral with the disk. The front hub is attached to the front face of a third disk and a rear hub to the rear face of the last disk. The hubs are secured to an assembly for rotor 84 by steel tie bolts, as mentioned above. A steel tube runs from one hub to the other inside rotor.

A tube is force-fit into the inside diameter of both hubs and permits breathing within its inside and keeps twelfth stage pressure air from the No. 3 and No. 4½ bearings.

A third spacer from the front has holes drilled in it. Through these holes, twelfth-stage air is bled into a rotor center where it is bled through holes in the front hub. The air is directed forward to a space just behind No. 3, bearing the rear support plate, and pressurizes the No. 3 bearing oil seal. Since there are no holes in the rear hub disk, the pressure of air against this disk counteracts part of the rotor forward thrust.

The case of the rear compressor 70 carries no structural bearing loads and is thus made of relatively thin sheet metal. Its purpose is to hold stator parts of the compressor and act as the air separator. The air pressure increases from front to rear and finally becomes a sixteenth stage pressure. Between this case 82 and the intermediate case 81 which envelopes it, the pressure is ninth-stage air. The case has a flange at its rear end to which screws that attach the case to the diffuser section 72 are secured. Also, bolt holes are provided to hold the intermediate case 70 to the diffuser section 72.

4. Diffuser Section

The velocity of air as it leaves the rear compressor 70 is very high. This motion is both rearward and tangential around the engine. The exit guide vanes at the forward end of the diffuser case 72 convert tangential whirl into pressure energy. After the vanes, the high pressure air will have a large rearward velocity. The gradual increasing area of air flow passages provided by the case configuration of the diffuser 72 decreases the air flow velocity to suitable burning speed and increases the pressure.

III. AFT CENTER BODY

At the aft portion of the turbine, there is a center body 38 about which the exhaust gas is expelled. In the modified core engine 20, the center body 38 is extended rearwardly so that it projects rearwardly beyond the aft direct of the mixer 29.

IV. FAN AIR DUCTS

The kit includes a bifurcated series of three ducts 26a, 26b and 26c; and 27a, 27b and 27c, respectively, on each side of the engine 20. The acoustically-treated ducts 26 and 27 extend from an engine fan air attachment 90 and terminate at the common nozzle 28.

A. General

The engine fan air collector consists of the two duct assemblies 26 and 27 on the side of the engine 20. Each duct assembly 26 and 27 has three interengaging duct sections 26a, 26b and 26c; and 27a, 27b and 27c, respectively, on each respective side of the engine 20. The bi-ducts 26a and 27a are constructed of bonded aluminum honeycomb, or composites and are interchangeable, right and left. Each duct assembly 26 and 27 is from front to rear: the forward bifurcated fan air duct 26a and 27a, hinged constant section fan air duct 26b and 27b, and transition section fan air duct 26c and 27c. All ducts can be of bonded aluminum honeycomb or composite material.

B. Forward Ducts, Constant Section Ducts and Transition Ducts

The collector system consists of the engine fan air ducting 26 and 27 and the engine turbine 75 and exhaust outlet section 129. During engine operation, the exhausted fan air from ducts 26 and 27 and the engine exhaust gases from outlet 129 join at the rear of the engine 20, into the common nozzle 28.

a. The forward bifurcated fan air ducts 26a and 27a are installed between the engine fan exit attachments 90 and the hinged constant section fan air ducts 26b and 27b. Each bifurcated duct 26a and 27a has a semi-circular shape at the forward end 91 to match the shape of the exhaust from fan attachment 90. The ducts 26a and 27a are bolted to the aft face of the fan exit 90 and are contoured at the aft end 92 to fit the side of the engine 20. The aft end 92 of the ducts 26a and 27a are fastened to the hinged constant section fan air ducts 26b and 27b, respectively, with bolted channel assemblies, which clamp the ends of the ducts 26a and 26b together and 27a and 27b together. Splitter webs, preferably in the range of 3 to 6, and more preferably 5, are attached to the inner surface of each duct to direct the flow of air through the ducts 26 and 27 and to provide additional supporting strength.

b. The hinged constant section fan air ducts 26b and 27b are installed between the forward bifurcated fan air ducts 26a and 27a and the transition section fan air ducts 26c and 27c, respectively. The ducts 26b and 27b are contoured to fit the side of the engine at the compressor section 70. The ducts 26b and 27b are fastened to the aft end 92 of the forward bifurcated fan air ducts 26a and 27a and to the front end 93 of the transition section fan air ducts 26c and 27c, respectively, with bolted channel assemblies, two on each side. These channel assemblies are hinged at the top with pins. By removing the two bolts from the upper and lower end of each channel assembly, the ducts can be rotated outward and upward. Splitter webs, preferably in the range of 3 to 6, and more preferably 3, are mounted internally in each duct 26b and 27b to direct the flow of air through the duct and to provide additional strength.

C. The transition section fan air ducts 26c and 27c are installed between the hinged constant section fan air ducts 26b and 27b. The ducts 26c and 27c are contoured to fit the side of the engine 20 and are attached at the firewall 30a by three rods on each side. The ducts 26c and 27c are attached at the forward end 93 to the hinged constant section fan air ducts 26b and 27b with bolted channel assemblies which clamp the ends of the ducts 26b and 26c together, and 27b and 27c together. The aft end 94 of the transition section fan air ducts 26c and 27c are fastened to the common nozzle shroud 60 by means of bolts. Splitter webs, preferably in the range of 3 to 6, and more preferably 4, are mounted internally in each duct 26c and 27c to direct the flow of air through the duct and to provide additional supporting strength.

V. COMMON NOZZLE

The common nozzle 28 allows the air from the fans 21 and 22 to enter and exit a chamber at the same time as the core exhaust gases from the exhaust outlet 129 from the core engine 20. It is this chamber which constitutes the common nozzle 28.

The core gas exhaust outlet 129 and fan gases from duct outlets 26c and 27c enter and exit the chamber of the common nozzle 28 at a predetermined nozzle exit size so as not to affect the performance of the engine 20.

The common nozzle 28 accepts a mixer 29 which allows mixing of gas from the core exhaust 20 and gases from the fans 21 and 22 for maximum benefit.

VI. MIXER

The mixer means 29 in the common nozzle 28 directs fan air into the core exhaust gas flow path downstream of the core engine 20. The mixer 29 includes 12 to 18 circumferentially-spaced, axially and radially elongated lobes 33 and 32, respectively, which define alternating hot and cold chutes. The fan gas (cold) chutes 32 are on the outside where the fan bypass air is located and the turbine exhaust (hot) chutes 33 are aligned with the interior core where the hot core air flows. The mixer 29 is designed to blend fan air 36. passing through fan ducts 26 and 27, with core exhaust gas emerging from the downstream low pressure turbine 75 of the core engine 20 from exhaust outlet 129.

The mixing reduces peak temperature of the exhaust stream and therefore reduces jet noise. Since thrust noise is a function of the peak temperature of the exhaust gas stream raised to the eighth power, even slight reductions in the peak overall jet temperature results in significant lowering of the perceived engine thrust noise. The mixer 29 provides the optimum mixing without adversely affecting the engine efficiency.

The mixer 29 has a plurality of alternating hot gas ducts 33 and cold gas ducts 32. Gas from the bypass ducts 26 and 27 enters into the cold gas ducts 32 which incline radially inward. The colder bypass gas is directed toward the central axis of the engine 20. Exhaust gas from the core of the engine 20 flows through the hot gas ducts 33 which have a greater cross-section and which incline slightly outward in a radial direction. The hot and cold (primary and fan) gas mix downstream of the mixer 29 with the result that the temperature of the mixed gas is less than that of the core gas from exhaust 129. This decrease in temperature results in decrease in noise, since the noise is a function of the maximum gas temperature exiting the engine tail pipe 42.

VII. MIXER ADAPTER RING—SPACER—TRANSITION RING

A. Mixer Installation In Common Nozzle

The mixer 29 is installed within the common nozzle 28 by using an adapter ring 36 which is attached to a flange at the end of the engine 20 and extends downstream of the hot and cold gases. This causes laminar flow air to enter the mixing chamber of the mixer 28 at the proper angle and facilitate the objective of mixing by positioning the mixer at a location where fan air is introduced in a full annular flow. The mixing chamber is defined as the area of the lobes 32 and 33 of the mixer 29. The downstream end of the ring 36 is attached to the mixer 29 and ends at about the position where lobes 32 and 33 begin.

VIII. MIXER TRANSITION CONTOUR PLATE (FAIRING)—FAN EXHAUST DUCT SEGMENT

The aerodynamic streamlining of the mixer fan stream is achieved with a circular transition contour plate 37. This transition contour plate 37 is for initially directing the fan air into the cold chutes 32 of the mixer 29. The plate 37 is attached to another contour plate 34 by the use of mechanical screws. The contour plates 37 and 34 provide laminar flow air through the downstream position to the mixer 29.

The contour plate 37 and 34 has the same function as a fairing. The plate 34 does not have any of the formed bosses other mixers require, but is a formed smooth annular plate 34 attached to the upstream end of the mixer 29 by mechanical screws.

IX. FAN AIR SHROUD

A fan air shroud 60 is located at the position downstream from the aft end 94 of the transition ducts 26c and 27c. This shroud 60 engages the outside perimeter 100 of the aft end 94 of duct 26c and 27c and thereby acts to assist the transition of the fan air from ducts 26 and 27 into the common nozzle 28. The shroud 60 extends around the mixer 29, and about the mixer adapter ring and about the contour plate.

The contour plate, or fairing 37 and 34, provides a smooth air cover for the mixer 29 attack angle thereby providing laminar air flow.

X. THRUST REVERSER

A. Mounting Ring, Adapter, Spacer—Exhaust Transition Duct Assembly

The kit comprises an aerodynamic transition ring 122 from the rear outer flange of the fan air shroud 60 of the common nozzle 28 of the engine 20. The shroud 60 permits proper gas path contours for mixer 29 and engine 20 performance. The thrust reverser ring 121 is mounted together with the ring 122.

B. Target-Type Thrust Reverser

The thrust reverser is a four-bar link 47 and 48, target-type system. Opposing doors 43 and 44 are rotated into position to block and divert the flow of exhaust gases from the primary nozzle 46 (located downstream from the mixer 29) by means of direct mechanical linkage to a hydraulic actuation system.

Two sets of linkage 47, 48 and 48a are employed for each thrust reverser door 43 and 44. Each set 47, 48 and 48a consists of three types of links: (i) a "driver" link 48 that imparts motion to the door, (ii) an "idler" link 47 that holds the door in alignment, and (iii) an "over-center" link 48a that connects the driver link 48 to the actuator 50, and provides the necessary mechanical advantage for deploying or stowing the system.

"Fail-safe" operation of the system is ensured by design incorporation of: (i) dual hydraulic actuators 50, each pivotally connected via the above-described linkage to opposing edges of the thrust reverser doors 43 and 44, and (ii) dual stowage latches, either of which is capable of overcoming initial deploy forces until the proper command sequence is given.

C. Thrust Reverser: Structural Description

The thrust reverser assembly serves two purposes: (i) in the stowed position, the reverser doors act as aerodynamic fairings for the nacelle afterbody 45, and (ii) in the deployed mode, the doors 43 and 44 divert the flow of gases from the primary nozzle 46 to achieve thrust reversal. The stangs 102 and 103 are located on the top and bottom of the tail pipe assembly 42.

Movement of the reverser mechanical system is accomplished by a pair of actuators 50 mounted in box stang structures 102 and 103 attached to the trailing portion of the nozzle 46. The "bird cage" fittings, also mounted from these structures, provide support for the translating carriage guide rods and pivot points for the thrust reverser linkages 47 and 48. Actuation forces are transmitted by the carriages to the overcenter links 48a, and then to the driver links 48.

Applied reverser loads are carried through the nozzle assembly into the common nozzle 28, and reacted at the engine exhaust flange.

XI. COWLING

A. General

1. The forward and aft cowling sections 110 and 111, attach together around the outer diameter of the engine 20 to form a completely enclosed nacelle 112. This provides protection for the exterior of the engine 20 and accessories, and provides a smooth, unrestricted airflow around the engine 20 during flight. The cowling consists of the nose cowl 52, inlet bullet 51, cowl doors 110, and aft cowl doors 111. The thrust reverser 41 completes the nacelle afterbody 45 of the engine 20.

2. The pylon apron 115 completes the upper portion of the cowling and provides the attach points for the forward cowl doors 110 and the aft cowl door 111.

B. Nose Cowl

The nose cowl 52 is the foremost section of the cowling and attaches directly to the engine inlet flange 113. The leading edge 114 contains a duct which directs engine anti-icing air around the inside of the nose cowl 52.

The kit incorporates an acoustically-treated, enlarged and extended nose cowl 52 in the range of about 42" to 52", and more preferably about 48", with a bonded all-metal or composite, fail-safe construction. The nose cowl 52 has an enlarged intake area to accommodate the largest engine of this type. The inlets are acoustically treated by the use of sound-deadening material to the interior surface of the nose cowl 52. This material is added to attenuate forward-projected turbo-machinery noise and serves to reduce noise during the operation of the engine 20.

Removable panels in the aft bulkhead of the nose cowl 52 provide access for maintenance on ducts and other components which are installed in the nose cowl 52.

C. Cowl Doors

1. The cowl doors 110 cover the major portion of the engine 20 and accessories, providing an unobstructed surface from the nose cowl 52 to the aft cowl 111. The doors 110 are attached to the pylon apron 115 by hinges equipped with quick-release type pins. Rotary-type tension latches are installed in the doors 110 to retain the doors 110 in the closed position. 41.

2. Integral struts, stowed on the inner surface of the doors 110, can be released and engaged with engine mounted brackets to support the doors 110 in the open position.

3. The right cowl door inlet duct provides cooling air for the engine compartment.

4. A pressure relief door in each cowl door 110 relieves excess compartment pressure.

5. Limited access doors are provided for servicing when the cowl doors 110 are closed.

D. Aft Cowl

1. The right and the left sections of the aft cowl 111 complete the faired surface of the nacelle between the forward cowl doors 110 and the thrust reverser 42. The upper edge of each section is connected to the pylon apron 115 with screws. Both sections of aft cowls 111 join at the bottom edge and are secured with two latch bolts.

2. An access door for the forward latch bolt is located above the latch in the right section.

3. An inlet duct in the right aft cowl 111 provides cooling air for the engine compartment.

XII. TAIL PIPE ASSEMBLY

The noise suppression kit further includes a modified tail pipe assembly 42 which is configured to have a greater cross sectional area in the exit plane so as to accommodate increased volume in the flow stream caused by introduction of the various components primarily the mixer within the gas flow path. The assembly 42 includes the nozzle assembly 46 in which there is the barrel nozzle 49, and at its exit end there is the nozzle 31.

XIII. INLET BULLET: CENTER BODY

The inlet bullet 51, having a length in the range of about 36" to 40", and more preferably about 38.35", when installed on the engine inlet accessory drive case flange, provides smooth airflow into the engine compressor 66 and protects accessories installed on the accessory drive case. The $N_1$ tachometer generator and the $P_{t2}$ inlet pressure sensing probe are housed in the inlet bullet 51.

The kit incorporates a newly-designed and lengthened center body acoustically treated with a bonded all-metal, fail-safe construction. The center body is designed for the inlet size and shaped to accommodate inlet flow angles. The center body is light bulb-shaped and acoustically treated by sound-deadening material to the exterior surface 116. This materials is added to attenuate turbo machinery noise and serves to reduce noise during the operation of the engine.

XIV. RESPACED INLET GUIDE VANE (RIGV)

The noise reduction kit includes components which respace the engine inlet guide vane 55 several inches forward. This allows more space between the rotating face of fan blade 21 and the fixed inlet guide vane 55.

This relocation of the fixed guide vane 55 in relation to the rotating fan blade 21 eliminates the siren effect and reduces the noise levels. An acoustically-treated duct 117 is inserted between the forward end of the front compressor 66 and the trailing end of the inlet guide vane 55.

XV. COMPRESSOR BLEED

The compressor bleed system 56 relieves the engine bleed pressure when it is not needed. A bleed valve is located in the rear compressor section 70.

When this valve is in the open position, large quantities of hot compressed air from the compressor 70 are normally exhausted through an opening emitting sound equal to many decibels.

In order to reduce this noise source, the noise reduction kit provides a duct 119 allowing the noise to be attenuated before reaching the atmosphere. The bleed dump valve incorporates a duct 119, which is attached to the bleed valve opening and extends from the valve and opening and terminates in the common nozzle 28. This cancels noise input from the bleed valve.

XVI. EXIT NOZZLE ASSEMBLY

The exit nozzle assembly 46 serves as the exhaust duct section of the engine nacelle package. It consists structurally of a welded sandwich barrel 49, having the inner face sheet perforated to improve noise abatement.

A forward flange 121 is welded into the barrel for mounting the nozzle assembly 46 to the common nozzle exhaust flange 122. Also attached to the forward flange 121 is a stiffened sheet aluminum bulkhead which supports the aft nacelle fairing and thrust reverse door latch fittings.

Castings 50 are bolted to the aft segment of the barrel 49 to provide support points for the thrust reverser assembly 42 and stang fairings 102 and 103.

A closure is utilized at the nozzle trailing edge in the form of a mechanically fastened sheet aluminum zee-ring and cone, incorporating a slip joint for thermal expansion 31. 44.

XVII. GENERAL

Many other forms of the invention exist, each differing from others in matters of detail only.

By this invention, the noise from the JT3D engine is considerably reduced by many decibels. The bypass ducts lead fan air to a common nozzle, which provides a first level of noise reduction. Other factors of noise reduction are provided in part by the bleed valve diversion to the common nozzle.

One or more of the noise-reducing features can be omitted. Thus, the noise attenuation features of the cowling and inlet bullet may be omitted in some situations. In some cases, there is a mixer in the common nozzle, whereas, in different cases, the mixer is omitted.

The invention is generally directed to providing a common nozzle for the JT3D family of engines to thereby reduce noise, while at the same time the engine retains satisfactory operating conditions. This had never previously been achieved or considered possible.

The invention is to be determined solely in terms of the following claims.

What is claimed is:

1. A noise reduction kit for modifying a two spool axial flow turbofan engine with multistage compressors and fan driven by multistage reaction turbines, and a thrust of at least about 18,000 lbs at sea level, including a fan at an upstream end of a core engine for generating axial fan air flow through bypass ducts terminating at a common nozzle and mixer in a tail pipe assembly disposed to axially receive and exhaust the exhaust gas and fan air selectively into a thrust reverser for converting axial flow of exhaust gas and fan air into reverse thrust, or for axial flow for disposing of the exhaust gas and fan air, the kit comprising:
   a) the mixer having an upstream end and an annular mixer wall axially extending downstream therefrom the wall being formed into a plurality of circumferentially alternating radially inward and radially outward lobes, the radially inward lobes defining cold chutes for radially inwardly diverting fan air and outward lobes defining hot chutes for permitting radially outward expansion of exhaust gas such that the common nozzle has a mixing plane area for each of the fan air flow and for the exhaust gas in a range between 700 and 800 square inches;
   b) an annular mixer adapter for fixing the mixer to the engine casing in a position downstream of and coaxial with the core engine;
   c) a mixer transition contour plate having an upstream end portion for coaxial attachment to the downstream end of the core engine and having an annular, axially extending transition contour plate portion for attachment to the upstream end of the mixer, the plate being shaped to aerodynamically conform to the mixer to direct fan air; and
   d) an annular transition duct 60 for axial disposition between the downstream end of the core engine and a thrust reverser, the duct 60 extending an axial flow path of mixed exhaust gas and fan air downstream of the mixer.

2. A kit as claimed in claim 1 wherein the plane area for the cold air is in the range of about 750 to 780 square inches, and about 752 square inches, and the plane area for the hot air is about 725 to 760 square inches, and about 727 square inches.

3. The kit as claimed in claim 1 wherein the thrust reverser includes a four bar target-type system including opposing doors rotatable into position to block and divert the flow of exhaust gases from a primary nozzle of the engine core by means of direct mechanical linkage to an hydraulic actuation system.

4. The kit as claimed in claim 2 including two sets of linkage are employed for each thrust reverser door, each linkage set including
   a) a driver link that imports motion to the door;
   b) a link for holding the door in alignment; and
   c) a link for connecting the driver link to an actuator, and for providing a mechanical advantage for deploying and stowing the door.

5. The kit as claimed in claim 1 including a nozzle assembly for serving as an exhaust duct section, the nozzle assembly being structurally a welded sandwich barrel with an inner face sheet perforated for acoustically dampen the tail pipe.

6. The kit as claimed in claim 1 including an acoustically dampened nose cowl for coaxial attachment to the upstream end of the core engine.

7. The kit as claimed in claim 1 further including a tail pipe assembly configured to have a cross sectional area in the exit for accommodating the flow stream caused by introduction of components including the mixer within the exhaust gas flow path.

8. The kit as claimed in claim 1 including a pylon apron for fitting and attaching an upperportion of a cowling for the engine and for providing attachment points for doors of the cowling and for an aft cowling.

9. The kit as claimed in claim 3 including an acoustic liner for the interior cone of the thrust reverser.

10. The kit as claimed in claim 6 wherein a nose cone has a length of about 36" to about 40".

11. The kit as claimed in claim 5 including an inlet cowling having a length of about 46" to about 50".

12. The kit as claimed in claim 1 wherein all axial flow front fan is axially separated by an amount equal approximately to the axial depth of blades of the fan, and wherein the inlet guide vane for the fans is extended about 3" to about 5" relatively forwardly.

13. The kit as claimed in claim 1 further including a tail pipe assembly configured to have a relatively greater cross sectional area in the exit for accommodating an increased volume in the flow stream from the common nozzle.

14. The kit as claimed in claim 1 includes a bleed air valve selectively operational to bleed air from the core engine when the valve is open, and a duct for directing bleed air to the vicinity of the common nozzle.

15. A noise reduction kit for modifying a two spool axial flow turbofan engine with multistage compressors and fan driven by multistage reaction turbines, the engine having a thrust of at least about 18,000 lbs at sea level, and including a fan at the upstream end of the core engine for generating axial fan air flow, the kit comprising:
   a) multiple bypass ducts terminating at a common nozzle and mixer in a tail pipe assembly disposed to axially receive and exhaust the exhaust gas and fan air into a thrust reverser for selectively converting axial flow of exhaust gas and fan air into reverse thrust;
   b) the mixer having an upstream end and an annular mixer wall axially extending downstream therefrom the wall being formed into a plurality of circumferentially alternating radially inward and radially outward lobes, the radially inward lobes defining cold chutes for radially inwardly diverting fan air and outward lobes defining hot chutes for permitting radially outward expansion of exhaust gas;
   c) an annular mixer adapter for fixing the mixer to the engine casing in a position downstream of and coaxial with the case engine;
   d) a mixer transition contour plate having an upstream end portion for coaxial attachment to the downstream end of the core engine and having an annular, axially extending transition contour plate portion for attachment to the upstream end of the mixer, the plate being shaped to aerodynamically conform to the mixer to direct fan air; and
   e) an annular transition duct for axial disposition between the downstream end of the core engine and the thrust reverser, the duct extending the axial flow path to permit achieving generally smooth laminar flow of mixed exhaust gas and fan air downstream of the mixer.

16. The kit as claimed in claim 15 wherein the thrust reverser includes a four bar target-type system having opposing doors rotatable into position to block and divert the flow of exhaust gases from the primary nozzle by means of direct mechanical linkage to a hydraulic actuation system.

17. The kit as claimed in claim 16 including two sets of linkage employed for each door, each set including a driver link for importing motion to the door, an idler link for holding the door in alignment, and an over center link for connecting the driver link to the actuator, and for facilitating deploying and stowing.

18. The kit as claimed in claim 16 including a replacement tail pipe with a nozzle assembly that serves as the exhaust duct section and consist structurally of a welded sandwich barrel, having the inner face sheet perforated to acoustically dampen the tail pipe and an acoustically dampened nose cone for coaxial attachment to the upstream end of the core engine.

19. The kit as claimed in claim 16 further including a modified tail pipe assembly configured to have a cross sectional area in the exit so as to accommodate the flow stream caused by introduction of the various components including the mixer within the exhaust gas flow path.

* * * * *